(12) United States Patent
Hupfer et al.

(10) Patent No.: US 12,523,160 B2
(45) Date of Patent: Jan. 13, 2026

(54) ELEMENT AND METHOD FOR COMPENSATION OF TOLERANCES AND/OR GAP WIDTHS OF A DEVICE AND ENGINE, ASSEMBLY METHOD FOR A SHAFT/HUB CONNECTION

(71) Applicant: Universität der Bundeswehr München, Neubiberg (DE)

(72) Inventors: Andreas Hupfer, Eching (DE); Niels Herter, Munich (DE)

(73) Assignee: Universität der Bundeswehr München, Neubiberg (DE)

( * ) Notice: Subject to any disclaimer, the term of this patent is extended or adjusted under 35 U.S.C. 154(b) by 0 days.

(21) Appl. No.: 18/700,699

(22) PCT Filed: Oct. 6, 2022

(86) PCT No.: PCT/EP2022/077808
§ 371 (c)(1),
(2) Date: Apr. 11, 2024

(87) PCT Pub. No.: WO2023/061844
PCT Pub. Date: Apr. 20, 2023

(65) Prior Publication Data
US 2024/0410291 A1 Dec. 12, 2024

(30) Foreign Application Priority Data
Oct. 12, 2021 (DE) .................... 10 2021 126 424.3

(51) Int. Cl.
*F01D 11/22* (2006.01)
(52) U.S. Cl.
CPC ................................. *F01D 11/22* (2013.01)

(58) Field of Classification Search
CPC ...... F01D 11/22; F01D 11/005; F01D 11/003; F01D 11/16; F04D 29/083; F04D 29/102; F04D 29/526; F16J 15/453; F16J 15/445
See application file for complete search history.

(56) References Cited

U.S. PATENT DOCUMENTS

| 4,145,058 A | * 3/1979 | Hady ..................... F16J 15/441 |
| | | 277/423 |
| 8,688,421 B2 | 4/2014 | Summers et al. |

(Continued)

FOREIGN PATENT DOCUMENTS

| CN | 108895108 A | * 11/2018 | .............. F16F 7/128 |
| DE | 102018133405 A1 | 6/2020 | |

(Continued)

OTHER PUBLICATIONS

Rockel, David; Weihard, Stefan; Hachmann, Andreas; "Numerical Investigation of an Additively Manufactured Compressor Casing: The Effect of Auxetic Structures on the Tip Clearances", Jun. 3-7, 2013, ASME Turbo Expo 2013, GT2013-95736, pp. 1-11 (Year: 2013).*

(Continued)

*Primary Examiner* — Courtney D Heinle
*Assistant Examiner* — Eric A Lange
(74) *Attorney, Agent, or Firm* — Kolisch Hartwell, P.C.

(57) ABSTRACT

An element for compensation of tolerances and/or gap widths of a device, having a main body which has at least one annular cross-sectional portion, wherein the cross-sectional portion has, in its peripheral direction, at least one auxetic portion which exhibits auxetic behavior in a radial direction of the main body. The invention also relates to an engine which comprises the element, to an assembly method (Continued)

for a shaft/hub connection which has at least one element, and to an adaptation method for adapting a tolerance and/or a gap width in the engine.

15 Claims, 11 Drawing Sheets

(56) References Cited

U.S. PATENT DOCUMENTS

| | | | | |
|---|---|---|---|---|
| 2011/0059291 | A1* | 3/2011 | Boyce | C08J 5/18 428/218 |
| 2011/0240194 | A1 | 10/2011 | Summers et al. | |
| 2015/0105482 | A1 | 4/2015 | Bianchi et al. | |
| 2017/0057704 | A1* | 3/2017 | Li | C09K 3/00 |
| 2019/0271237 | A1* | 9/2019 | Martin | F01D 25/26 |
| 2020/0191162 | A1* | 6/2020 | Weihard | F04D 29/4206 |
| 2021/0131303 | A1 | 5/2021 | Prasad et al. | |

FOREIGN PATENT DOCUMENTS

| | | | |
|---|---|---|---|
| EP | 2615246 A1 | 7/2013 | |
| GB | 2514074 A | * 11/2014 | ............ A61F 2/915 |

OTHER PUBLICATIONS

Sanami Mohammad et al., "Auxetic Materials for Sports Applications", Procedia Engineering, vol. 72, 2014, pp. 453-458, Doi: 10.1016/J.PROENG.2014.06.079; ISSN:1877-7058, XP028875482; p. 454; Figures 4(a)-(c).

Jun. 14, 2022, Office Action from the German Patent and Trade Mark Office regarding German Patent Application No. 10 2021 126 424.3, which is the German priority application to this U.S. national phase application.

Jan. 27, 2023, Written Opinion of the International Searching Authority from the European Patent Office regarding PCT Patent Application No. PCT/EP2022/077808, which is the international application to this U.S. national phase application.

* cited by examiner

ELEMENT AND METHOD FOR COMPENSATION OF TOLERANCES AND/OR GAP WIDTHS OF A DEVICE AND ENGINE, ASSEMBLY METHOD FOR A SHAFT/HUB CONNECTION

CROSS-REFERENCE TO RELATED APPLICATIONS

This application is a national phase application of PCT/EP2022/077808, filed Oct. 6, 2022, which is hereby incorporated by reference.

BACKGROUND OF THE INVENTION

The invention relates to an element for compensation of tolerances and/or gap widths of a device, to an assembly method for a shaft/hub connection comprising the element, and to an adaptation method for adapting the tolerance and/or gap width in an engine which comprises the element. The invention furthermore relates to the engine which comprises the element.

SUMMARY OF THE INVENTION

Conventional components, for example sealing rings or housings, are typically formed from materials which have a positive Poisson's ratio. This material property is characterized in that exerting a compressive force on the material leads to the material compressing in the direction of the force, and thickening perpendicularly to the direction of the force. If a tensile force is exerted on the material, then the material of the component stretches in the direction of the force, and tapers perpendicularly thereto.

The object of the invention is that of providing an element which, in particular under tensile forces and/or compressive forces, can compensate tolerances of a device, in particular of an engine.

This object is achieved by the features of the independent claim. The dependent claims relate to preferred developments of the invention.

The element according to the invention for compensating tolerances of a device comprises a main body which has at least one annular cross-sectional portion. In this case, the cross-sectional portion has, in its peripheral direction, at least one auxetic portion which exhibits auxetic behavior in a radial direction of the main body. In this case, "auxetic behavior" means that the cross-sectional portion has a negative Poisson's ratio with respect to the radial direction of the main body. This means that, when the cross-sectional portion experiences a compressive force perpendicularly to the radial direction, the cross-sectional portion compresses in the radial direction. Thus, by means of this compression the element according to the invention can compensate tolerances of the device when the element and/or the device experiences or generates a compressive force or tensile force perpendicularly to the radial direction of the element.

In this case and in the following, "annular" is to be understood as follows. An annular shape is in principle not restricted to a circular ring shape (for example O-ring). Rather, the cross-sectional portion of the main body can be any polygonal ring shape, wherein the outer periphery thereof forms a polygon in a cross-sectional view (for example a triangle, square, or any polygon). In this case, for example an outer periphery of the ring shape, in the radial direction, can be round and/or polygonal. An example of this is an angular ring (for example a hex nut or square nut). An inner periphery thereof can also be round or also polygonal. A combination of round and/or polygonal portions of one or both inner and outer peripheries is also possible. In this case, the above-mentioned ring shape also does not necessarily have to form a closed ring, but rather can instead also form a half ring or for example a slotted ring. Examples for such shapes can be an annular disc from a hollow cylinder, or for example an angular disc from a hollow cuboid. Furthermore, the auxetic portion does not have to extend over an entire periphery of the cross-sectional portion. As an example for this, a quarter of a disc of a hollow cylinder can be configured to be auxetic, wherein the main body corresponds to the hollow cylinder, the disc corresponds to the cross-sectional portion of the hollow cylinder, and the quarter of the disc corresponds to the auxetic portion.

It is in particular advantageous if the at least one auxetic portion, in particular all the auxetic portions, of the cross-sectional portion exhibits auxetic behavior only in the radial direction of the main body.

It is in particular advantageous if the at least one auxetic portion, in particular all the auxetic portions, of the cross-sectional portion does not exhibit any auxetic behavior in a direction perpendicular to the radial direction. In particular, the auxetic portion does not exhibit any auxetic behavior in or in parallel with the longitudinal extension direction of the main body.

Advantageously, the at least one auxetic portion, in particular all the auxetic portions, of the cross-sectional portion has a not insignificant extension over a thickness of the cross-sectional portion. In other words, the auxetic portion(s) is/are formed perpendicularly to the longitudinal extension direction and in parallel with the radial direction, in a substantial region of the thickness. It is particularly advantageous if the extension of the auxetic portion(s), in the thickness direction, is in each case ¼, preferably ⅓, preferably ½, preferably ⅔, and/or preferably ¾ of the thickness of the cross-sectional portions. The thickness of the cross-sectional portion is for example a distance in the radial direction between an inner periphery and an outer periphery of the cross-sectional portion.

Particularly preferably, the auxetic portion(s) is/are formed in the entire thickness direction of the cross-sectional portion.

The at least one auxetic portion of the cross-sectional portion preferably comprises a plurality of interconnected auxetic cells in the radial direction. In this case, the auxetic cells can adjoin one another. As a result, the auxetic effect in the radial direction of the main body can be increased.

Advantageously, the at least one auxetic portion, in particular in each case at least one auxetic cell of the auxetic portion, comprises two longitudinal webs and two transverse webs in a section along a longitudinal axis of the main body. In this case, the longitudinal webs extend in a longitudinal extension direction in parallel with the longitudinal axis of the main body. In this case, the transverse webs extend between the longitudinal webs. Furthermore, the transverse webs each comprise at least one kink. This arrangement makes it possible for a particularly stable and resilient or flexible auxetic shape of the auxetic portion or of the auxetic cell to be formed.

It is furthermore advantageous if the at least one auxetic portion, in particular in each case at least one auxetic cell of the auxetic portion, comprises at least one force web. In this case, one end of the force web is connected to a kink. Proceeding from the kink, the force web extends in the longitudinal extension direction of the main body. As a result, an auxetic shape is achieved in which a compressive force and/or tensile force perpendicular to the radial direction of the main body or in the longitudinal extension direction of the main body is transmitted via a force web to the kink of the auxetic portion or the at least one auxetic cell of the auxetic portion. As a result, a particularly resilient and stable auxetic shape for the auxetic portion can be formed.

The at least one auxetic portion, in particular in each case at least one auxetic cell of the auxetic portion, is preferably in the shape of a double arrowhead. Alternatively or in addition thereto, the auxetic portion, in particular in each case at least one auxetic cell of the auxetic portion, can be of a chiral shape. In this case, the double arrowhead shape, the chiral shape, and the auxetic shape explained above comprising two longitudinal webs and two transverse webs can be combined with one another, such that different auxetic portions of a cross-sectional portion, or different cross-sectional portions of the main body, can in each case be of different auxetic shapes of the above-mentioned variants. In this case, for example a cross-sectional portion or the main body can have the auxetic shape explained above comprising the two longitudinal webs and two transverse webs, a further cross-sectional portion of the main body can be of the double arrowhead shape, and a further cross-sectional portion of the main body can be of the chiral shape. As a result, for example different regions of the main body can comprise different auxetic portions, wherein as a result for example different cross-sectional portions of the main body can have different elasticities and mechanical stabilities.

It is particularly preferred if the element is configured as a seal, in particular as a contactless seal. In this case, the cross section, in particular the cross-sectional portion, of the main body is entirely in the shape of a circular ring. In this case, the auxetic portion of the main body can extend over the entire longitudinal extension direction, in particular additionally over an entire peripheral direction of the main body. In other words, in this case the entire main body of the element formed as a seal can exhibit auxetic behavior in the radial direction. As a result, a seal can be formed and used which exhibits auxetic behavior under tensile forces and/or compressive forces along the longitudinal extension direction (perpendicularly to the radial direction of the seal), such that for example a thickness of the seal shrinks in the event of compressive forces in the radial direction. In this case, an inner radius of the seal is preferably widened, or an inner periphery of the seal is enlarged.

It is particularly preferred if the element is configured as a housing of the device. As a result, tolerances between the housing and elements received in the housing can be selectively compensated.

Advantageously, the element can be configured as a shaft and/or as a hub of a shaft/hub connection. In this case, for example when assembling the shaft/hub connection, a compressive force or a tensile force can be applied to the shaft and/or the hub, for example while the shaft is introduced into the hub. As a result, a force-fitting and/or form-fitting shaft/hub connection that is particularly easy to release again can be established.

The invention relates in particular to a shaft/hub connection which comprises the element or a plurality of the elements according to the above preferred developments.

The invention furthermore relates to an engine which comprises at least one element according to any of the above preferred developments.

In this case, the at least one element can in particular be configured as a seal, housing, shaft or as a hub of the engine.

It is particularly advantageous if a fan stage and/or a compressor and/or a turbine of the engine comprises the at least one element. In this case, the at least one element can for example be configured as a seal or as a housing of the fan stage and/or of the compressor and/or of the turbine. If the element is configured as a housing of the fan stage and/or of the compressor and/or of the turbine, then a gap width between blades of the fan stage and/or blades of the compressor and/or blades of the turbine, and the housing thereof, can be reduced or increased under application of tensile or compressive force along a longitudinal extension direction of the fan stage and/or of the compressor and/or of the turbine. In other words, a distance between the blade tips and the housing is reduced when the housing experiences a tensile force in the longitudinal extension direction (perpendicular to the extension direction of the blades). As a result, a higher efficiency as well as a greater aerodynamic operating range of the engine can be achieved.

The above-mentioned tolerance can in particular be a clearance between the blades and the housing.

The invention furthermore relates to an assembly method for a shaft/hub connection. In this case, the shaft/hub connection comprises a shaft and a hub, wherein the shaft and/or the hub is/are configured as the element explained above. The assembly method comprises the following steps: A first step, in which pressure is applied to the shaft configured as the element and/or to the hub configured as the element, along a longitudinal extension direction of the main body. A second step, in which the shaft is introduced into the hub. A third step, in which the application of pressure to the shaft and/or to the hub is stopped. As a result, a particularly quick and easy assembly method for the shaft/hub connection can be provided.

In this case, the first and the second step are advantageously performed simultaneously. In particular, in this case, the second step is performed during the first step and before the third step. In this case, the third step is preferably performed after the second step.

Advantageously, the shaft comprises a groove and/or a recess. In this case, an outer periphery of the shaft outside of the groove and/or outside of the recess is formed such that the hub, formed as the element, in particular formed so as to be auxetic in the radial direction, at least in portions, fits only into the groove and/or the recess, without application of pressure, but not onto the outer periphery of the shaft outside of the groove and/or outside of the recess.

The groove and/or the recess of the shaft can in particular be annular and can extend in particular over the entire peripheral direction of the shaft, or can extend merely over a portion of the shaft extending in the peripheral direction.

The groove and/or the recess of the shaft can in particular be helical. In other words, the groove and/or the recess of the shaft can extend in the longitudinal extension direction and peripheral direction of the shaft, similarly to a thread.

Advantageously, the shaft and/or the hub can comprise one or more sealing lips or projections, which engage in recess(es) of the hub and/or of the shaft, wherein these engage in one another, in particular in a contactless manner, in the recess of the corresponding element, without application of pressure.

Advantageously, in this case the hub configured as an element is arranged in a pressure application device. An example for the pressure application device is, as explained below, a clamp. A further example for the pressure application device can be an arrangement of flexible pressure chambers, in particular bellows, for pneumatic pressure application. In this case, for example an inner periphery or an outer periphery of the hub can be varied, in particular also during operation of the shaft/hub connection. For example, as a result the shaft/hub connection can be used as a type of coupling, i.e. with coupling slip between the shaft and the hub.

The invention also relates to an adaptation method for adapting a tolerance and/or a gap width in an engine according to the preferred embodiments explained above. In this case, the element explained above is configured as a housing of the fan stage and/or of the compressor and/or of the turbine. The tolerance and/or gap width adaptation method comprises the following step of: Applying pressure to the housing, such that the tolerance between a blade of the fan stage and/or a blade of the compressor and/or a blade of the turbine, and the housing, increases or decreases. As a result, the tolerance or a clearance between the blades and the corresponding housing can be changed, in particular in a temporally variable and flexible manner, in particular can be adapted to a particular flight situation (for example turning flight of an aircraft comprising the engine).

In this case, a pneumatic pressure is advantageously applied to the housing. In this case, a pressure prevailing in the fan stage and/or in the compressor and/or in the turbine is diverted to the housing. Alternatively or in addition thereto, an external compressor can be used for generating the pneumatic pressure. For this purpose, the housing advantageously comprises cavities. Alternatively or in addition thereto, the housing advantageously comprises bellows. In this case, the above-mentioned pressure can in particular be a pressure of an air mass, the pressure of which is changed by the fan stage and/or by the compressor and/or by the turbine.

Advantageously, the pressure can be diverted to the corresponding housing by means of one or more lines. In this case, for example pre-existing bleed connections (also known as "bleed points") of the engine can be used or connected to a line which diverts the pressure to the corresponding housing. Such bleed connections of the engine are for example a bleed connection for air for an air-conditioning system of the aircraft comprising the engine.

Advantageously, the corresponding housing can comprise at least one, preferably at least two, double-walled portions, in the longitudinal direction. In this case, the portion (in the longitudinal direction of the housing) of the housing that is configured as the element, i.e. configured to be auxetic in the radial direction, can be arranged between the double-walled portions or adjacently to the double-walled portion. If the at least one double-walled portion of the corresponding housing is now filled with compressed air, in particular with the above-described bleed compressed air, then said compressed air pneumatically applies pressure to the at least one auxetic portion of the housing. As a result, a tolerance or a clearance of the auxetic portion of the housing is changed.

Advantageously, pressure is applied mechanically to the corresponding housing. In this case, pressure is preferably not applied pneumatically to the corresponding housing.

Advantageously, in this case, the housing is arranged in a clamp, wherein the clamp applies pressure to the housing.

Preferably, in this case, the clamp can comprise at least one, preferably two, screw plates, which are arranged substantially perpendicularly to the longitudinal extension direction of the housing, on one or both ends of the housing, in the longitudinal extension direction. Furthermore, the clamp preferably comprises at least one screw, which engages in the screw plate(s). Tightening the screw causes a distance between the screw plates or a distance between the housing and the screw plate to reduce, as a result of which mechanical pressure is applied to the housing.

In the above cases, in which merely one double-walled portion and/or merely one screw have been described, an air pressure from outside onto the housing (for example air pressure during flight of an aircraft comprising the engine) or an adjacent component of the engine can deliver a counterforce to just one double-walled portion under pneumatic pressure application, and/or to just one screw plate under mechanical pressure application.

The engine advantageously comprises a control unit. The control unit is configured to control the application of pressure to the element of the engine.

The control unit is preferably configured to control and/or regulate the pneumatic pressure. In this case, the control unit can for example be connected to a valve in the line explained above, and can control the valve.

The control unit can furthermore advantageously be connected to a pressure sensor, which detects a pressure prevailing on the element.

The control unit can furthermore advantageously be connected to the above-explained screw of the clamp, in order to control and/or regulate the mechanical pressure application. In this case, the screw can preferably be turned by means of an actuator, wherein the actuator is preferably controlled by the control unit.

Advantageously, the actuator is a hydraulically or pneumatically operated drive element.

The control unit can in particular be connected to and/or be in communication with a control unit of the aircraft comprising the engine.

In the explanations above, in particular in the method, pressure is preferably applied to the element on both sides, in the longitudinal direction, such that the element is compressed in the longitudinal direction.

In the explanations above, in particular in the method, pressure is preferably applied purposely and actively to the element, in particular the shaft and/or the hub and/or the corresponding housing of the engine. In other words, in this case preferably a passive pressure prevailing from the outside (for example in the case of a movement of the element by air) is not understood as the pressure application explained above.

In the explanations above, the element can be made of plastics material, in particular of fiber-reinforced plastics material, and/or metal.

BRIEF DESCRIPTION OF DRAWINGS

Further details, advantages and features of the present invention emerge from the following description of embodiments, with reference to the drawings, in which.

DETAILED DESCRIPTION OF THE INVENTION

Further details, advantages and features of the present invention emerge from the following description of embodiments, with reference to the drawings.

Figure 1A:
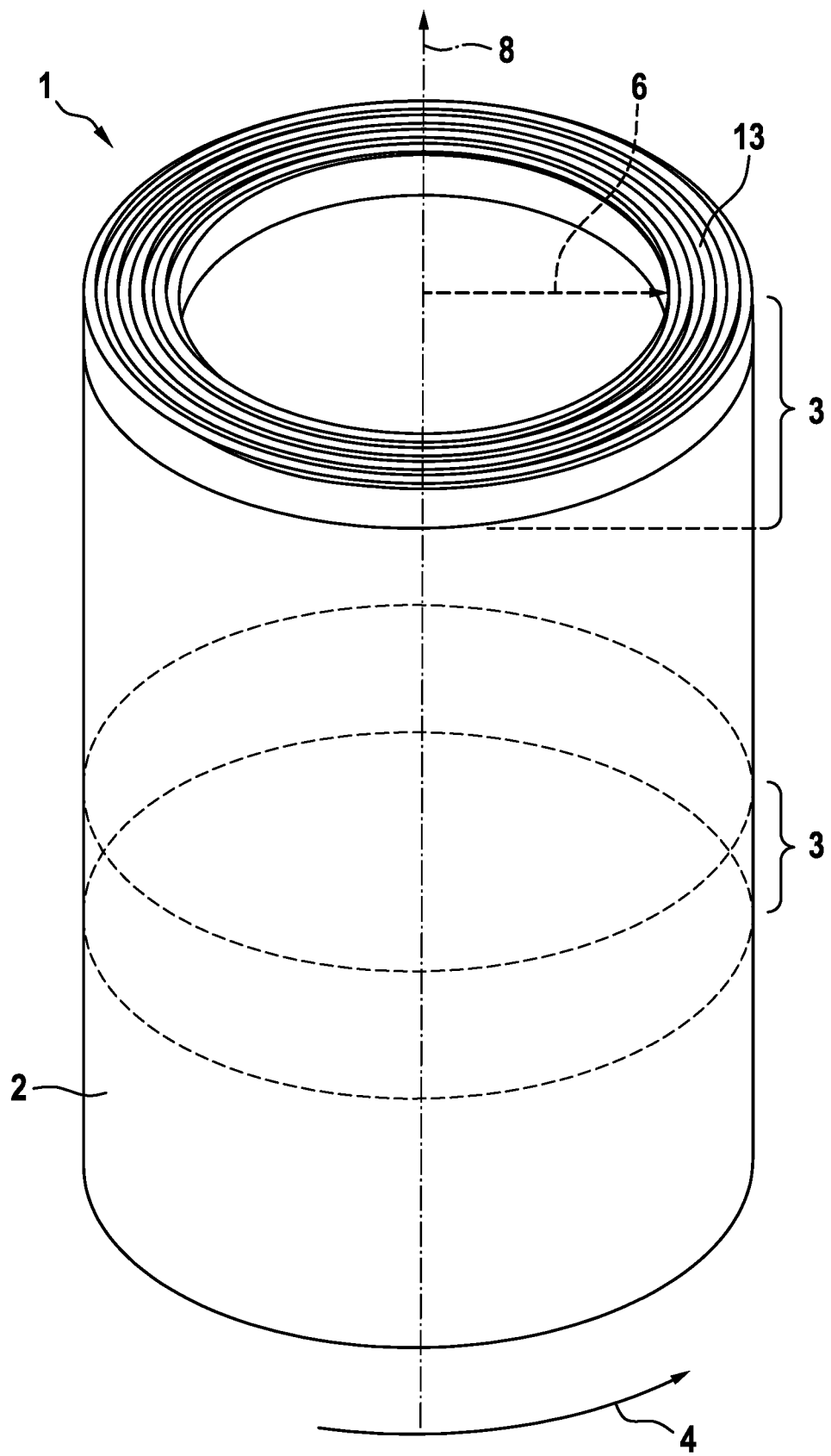
FIG. 1a, b, c are schematic perspective views of elements and cross-sectional portions of elements, by way of example, according to a first embodiment of the present invention.

FIG. 1a is a schematic and perspective views of an element 1, by way of example, according to a first embodiment of the present invention.

As is explained in the following, the element 1 is configured to be auxetic, in order to compensate tolerances in a device (for example of an engine or an internal combustion engine). Initially, an essential design of the element 1 is explained with reference to FIG. 1a, b, c to FIG. 4.

As can be seen from FIG. 1a, in this case the element 1 is configured, by way of example, as a hollow cylinder. In this case, the entire hollow cylinder forms a main body 2 of the element 1. Said main body 2 comprises a plurality of cross-sectional portions 3 along a longitudinal axis 8 of the main body 2, which portions exhibit auxetic behavior in a radial direction 6. An element 1 of this kind can for example be used as a housing.

Figure 1B:
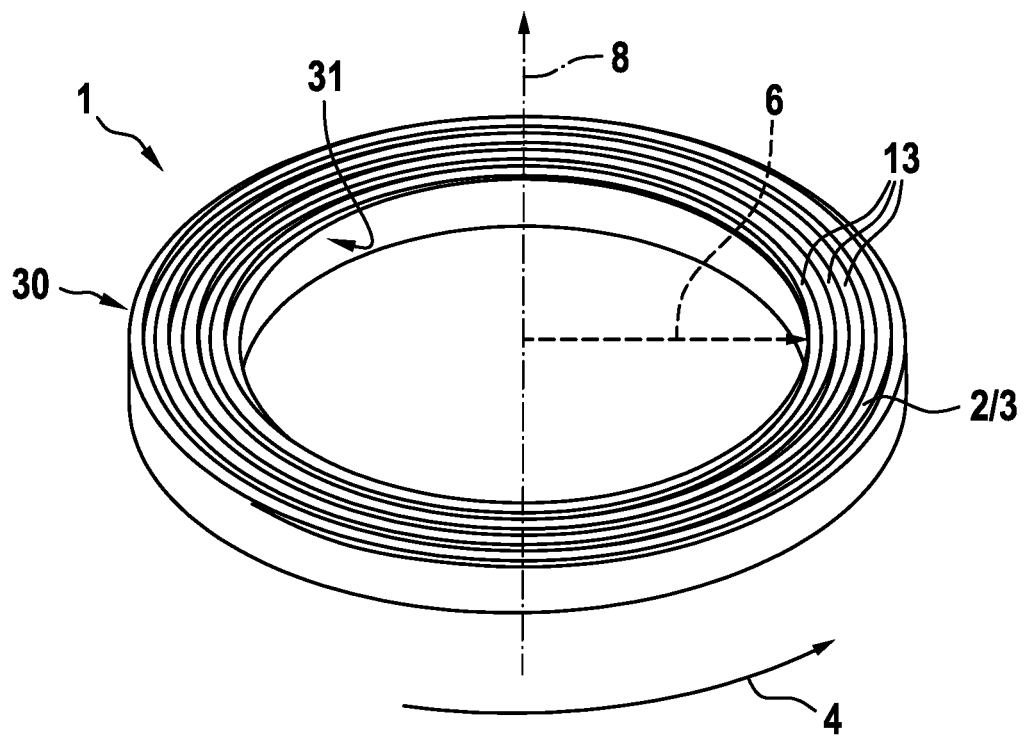
Figure 1C:
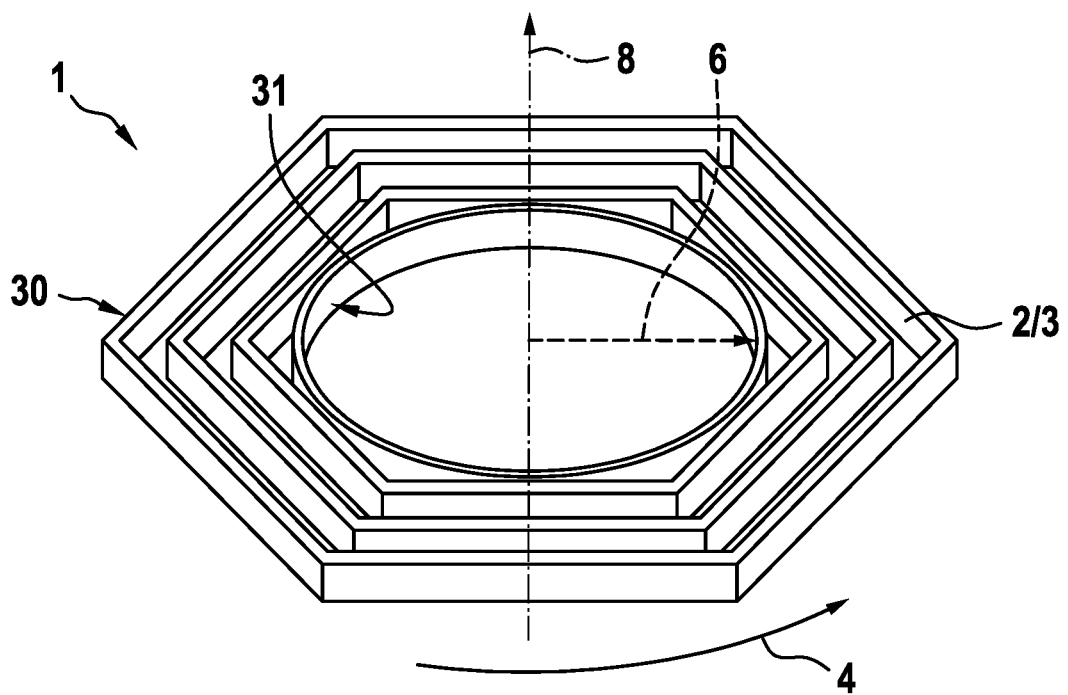

FIG. 1b, 1c are each schematic perspective views of elements 1, by way of example, according to a first embodiment of the present invention. More precisely, FIGS. 1b and 1c each show a cross-sectional portion 3 of the element 1 shown in FIG. 1a or of the main body 2 of the element 1.

It can be seen in FIG. 1a, b that said cross-sectional portion 3 is formed over the entire periphery, i.e. along the entire peripheral direction 4, of the main body 2. The cross-sectional portion 3 shown in FIG. 1b is a circular ring as a disc from the hollow cylinder in FIG. 1a. Alternatively, however, the entire element 1 can also be constructed as shown in FIG. 1b. In other words, the entire main body 2 can be configured to be auxetic. In this case, the main body 2 comprises exactly one cross-sectional portion 3 along the longitudinal axis 8.

Furthermore, it should be noted that it is also possible for only a part of the element 1, in the peripheral direction 4, to be configured to be auxetic. As an example for this, it is possible for only half or only a quarter, in the peripheral direction 4, of the element 1 shown in FIG. 1b to be configured to be auxetic.

FIG. 1c furthermore shows an alternative cross-sectional shape of the element 1. In this case, the entire element 1, i.e. the entire main body 2 thereof, or only a cross-sectional portion 3 thereof, can be of an angular ring shape, as shown in FIG. 1c. In this case, an outer periphery 30 of the cross-sectional portion 3 is configured as a polygon, in this case for example as a hexagon. In this case, an inner periphery 31 of the angular ring shape is configured for example as a circle, but can also be polygonal.

In the following the auxetic structure of the cross-sectional portion 3 is explained with reference to FIGS. 2 to 4.

Figure 2:
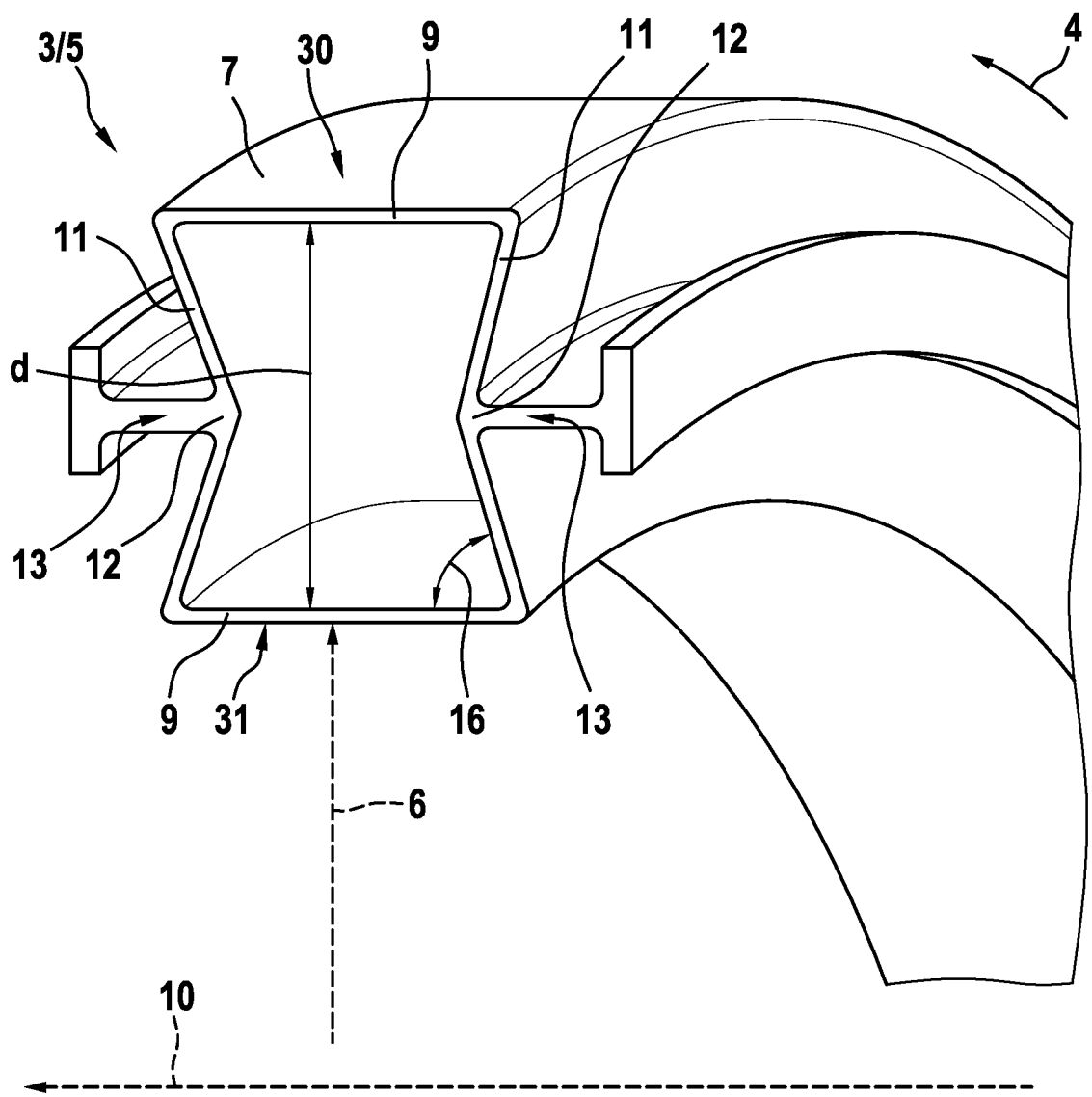
FIG. 2 is a cross-sectional view of the cross-sectional portion of a main body of the element according to the first embodiment of the present invention.
Figure 3:
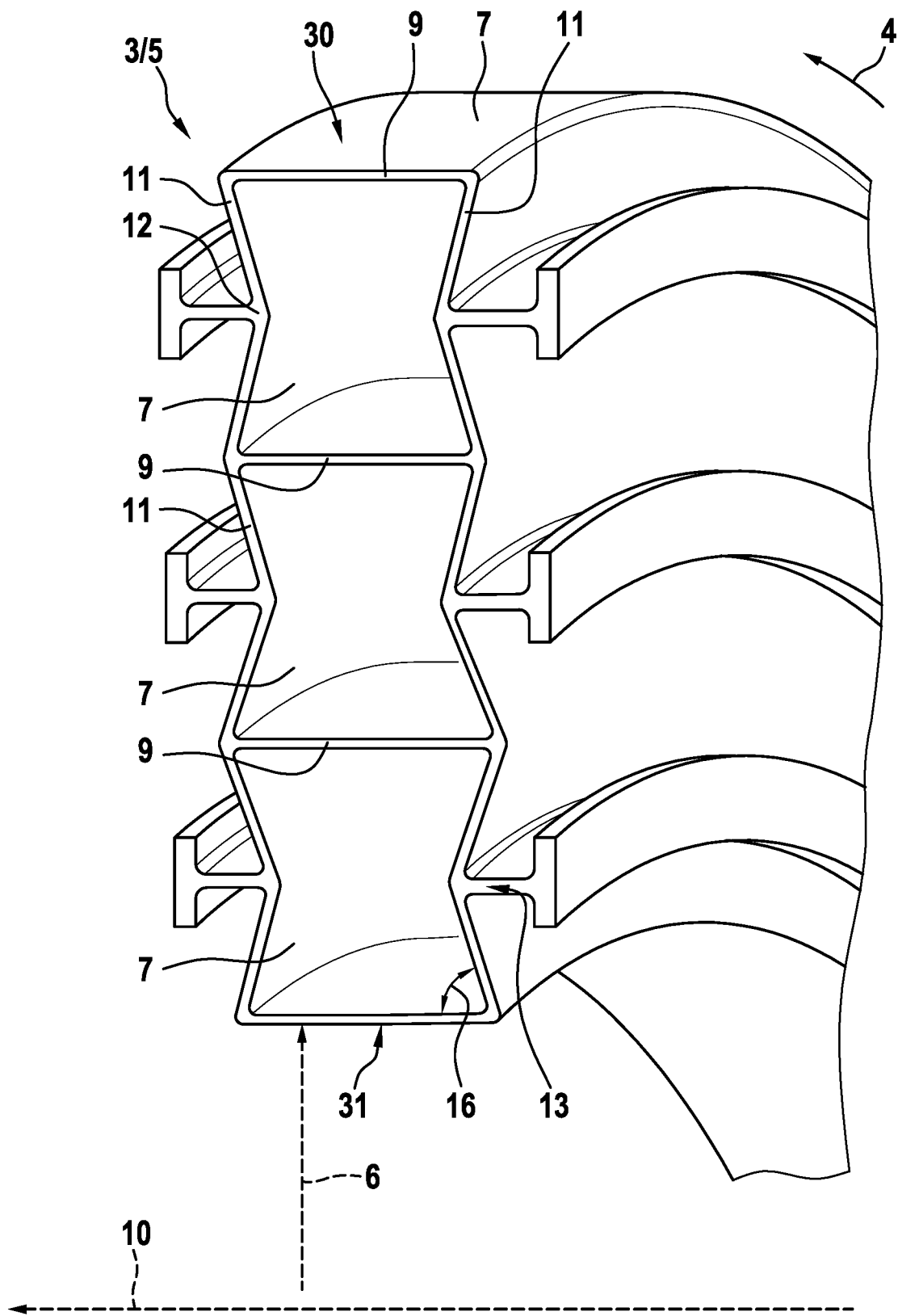
FIG. 3 is a cross-sectional view of a cross-sectional portion of the main body of the element according to the first embodiment of the present invention.
Figure 4:
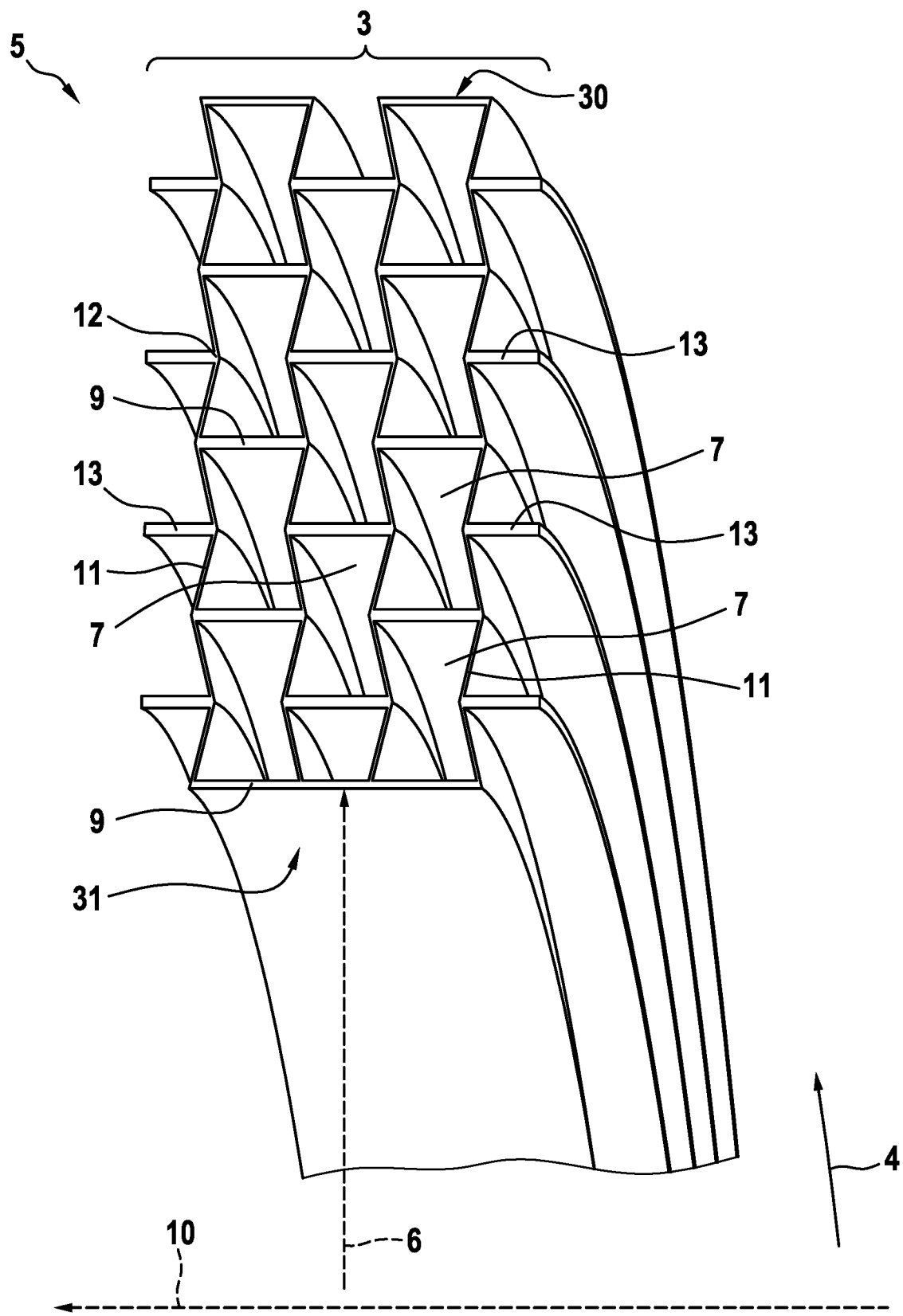
FIG. 4 is a cross-sectional view of a cross-sectional portion of the main body of the element according to the first embodiment of the present invention.

FIGS. 2 to 4 are each a cross-sectional view of the cross-sectional portion 3 of the main body 2 of the element 1 according to the first embodiment of the present invention.

FIG. 2 in particular shows a cross-sectional portion 3 which is formed of precisely one auxetic cell 7. The auxetic cell 7 enables the auxetic behavior of the element 1.

In this case, the auxetic cell 7 comprises two longitudinal webs 9, which extend in a longitudinal extension direction 10 in parallel with the longitudinal axis 8 (see FIG. 1a, 1b, 1c). The auxetic cell 7 furthermore comprises two transverse webs 11, which extend between the longitudinal webs 9 and each comprise a kink 12. Force webs 13 are connected to the kinks 12, which webs also extend in the longitudinal extension direction 10.

The kinks 12 of the auxetic cell 7 are resiliently deformable. If a force is applied to the kinks 12, in particular by means of the force webs 13, then the kinking of the kinks 12 changes. In other words, a compressive force or a tensile force in the longitudinal extension direction 10 leads to an angle 16 between the longitudinal webs 9 and the transverse webs 11 becoming smaller or larger. A compression of the auxetic cell 7 by a compressive force in the longitudinal extension direction 10 leads to a distance d between the longitudinal webs 9 reducing. In contrast, a tensile force in the longitudinal extension direction 10 leads to an increase in the distance d between the longitudinal webs 9.

Thus, the element 1, or an auxetic portion 5 of the cross-sectional portions 3, reacts in an auxetic manner to forces along the longitudinal extension direction 10 of the element 1. As a result, as can be seem from FIG. 2, the auxetic portion 5 exhibits auxetic behavior in the radial direction 6.

If the element 1 shown in FIGS. 1 and 2 is used for example as a sealing ring, then a compressive force thereon along the longitudinal extension direction 10, i.e. perpendicularly to the radial direction 6 (perpendicularly to the radial plane) can bring about radial widening of the sealing ring. In this case, an inner radius or an inner periphery of the sealing ring becomes larger under pressure. Conventional sealing rings, for example O-rings, become thicker under application of pressure. That is to say that an inner radius of conventional sealing rings becomes smaller under pressure, while an outer radius thereof becomes larger under pressure. As a result, the element 1 can compensate tolerances, for example as a sealing ring or housing, of the device, in particular when compressive forces are applied to the device.

FIG. 3 shows a modification of the auxetic portion 5 shown in FIG. 2. In this case, the auxetic portion 5 comprises a plurality of auxetic cells 7 that adjoin one another in the radial direction 6. This has the advantage that a compressive force in the longitudinal extension direction 10, i.e. perpendicularly to the radial direction 6, which is distributed over the force webs 13, brings about an increased auxetic behavior in the radial direction 6.

FIG. 4 shows a modification of the auxetic portion 5 shown in FIG. 2 or in FIG. 3. In this case, the auxetic portion 5 comprises a plurality of auxetic cells 7 that adjoin one another in the radial direction 6 and in the longitudinal extension direction 10. As a result, the auxetic behavior of the cross-sectional portion 3 in the radial direction 6 can be further increased. As a result of this, too, larger cross-sectional portions 3, in the longitudinal extension direction 10, can be configured to be auxetic.

Various examples of use, in addition to the above-mentioned embodiment as a sealing ring, for the element 1 according to the first embodiment of the present invention will now be discussed with reference to FIG. 5 and FIG. 6.

Figure 5A:
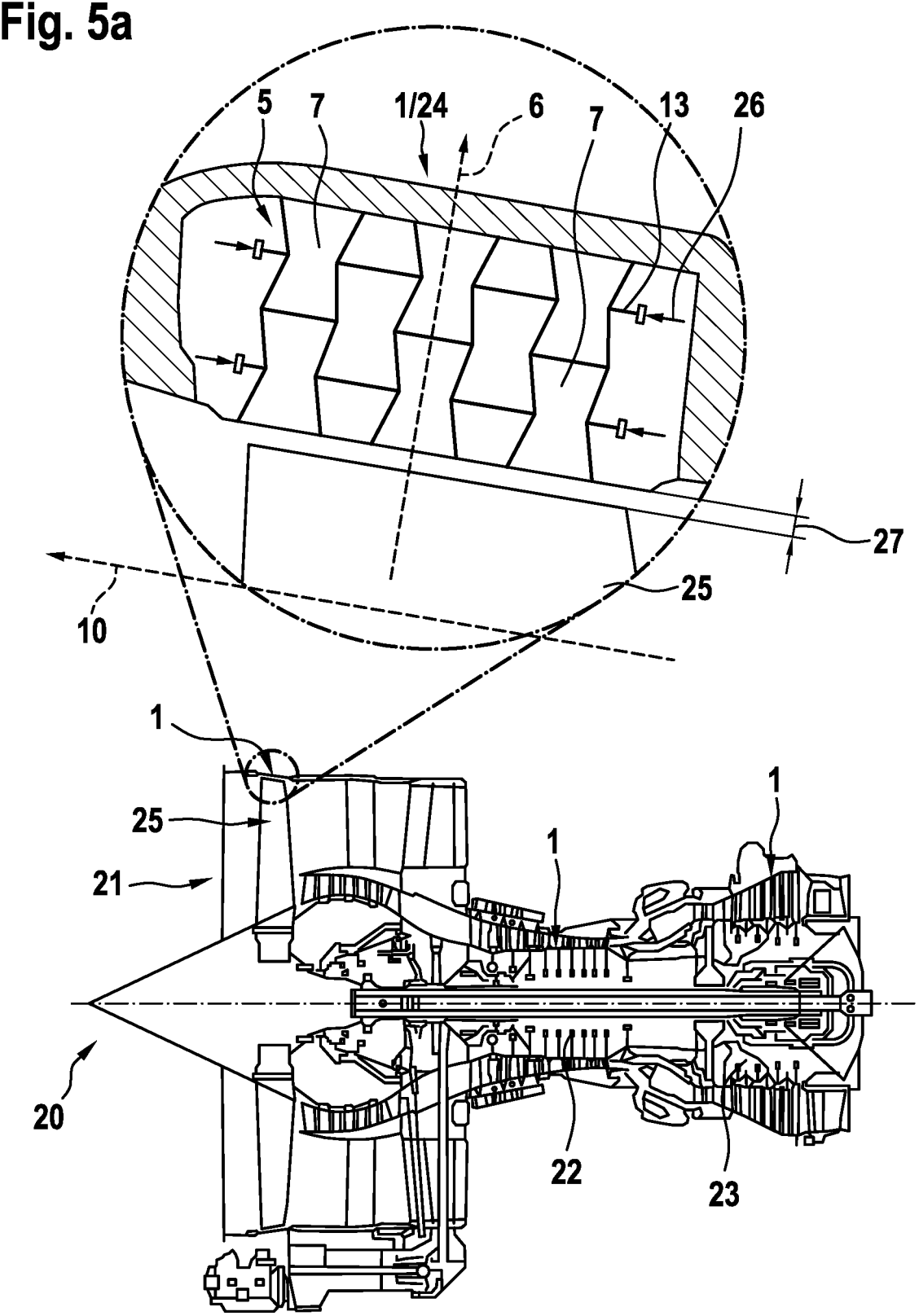
FIG. 5a, b, c are sketches of an engine comprising an element according to the first embodiment of the present invention.

In this case, FIG. 5a is a sketch of an engine 20 comprising an element 1 according to the first embodiment of the present invention. In this case, the engine 20 comprises a fan stage 21, a compressor 22 and a turbine 23.

As can be seen from the detail view window in FIG. 5a, in this case a housing 24 of the fan stage 21 is configured as the element 1 explained above. In other words, the main body 2 of the element 1 forms the housing 24 of the fan stage 21. In this case, the housing 24 comprises an auxetic portion 5 (see in this respect also FIG. 4).

The fan stage 21 comprises blades 25. In this case, the housing 24 is configured as an element 1, in order to enable the smallest possible tolerance (clearance) between the blades 25 and the housing 24 of the fan stage 21. Thus, for example, operation of the engine 20 can generate compressive forces 26 which act along the longitudinal extension direction 10, in particular on the force webs 13 of the auxetic cells 7. Thereby, an inner periphery of the housing 24 is enlarged, as a result of which a gap 27 between the blades 25 and the housing 24 is increased. Vice versa, a load relief of the compressive force or acting tensile force, which load relief acts on the auxetic cells 7, can reduce an inner periphery of the housing 24, as a result of which the gap 27 is made smaller.

Furthermore, it should be noted here that, in addition or alternatively thereto, the engine 20 can comprise the element 1 as a housing 24 for the compressor 22 and/or for the turbine 23. Furthermore, in addition or alternatively thereto, the engine 20 can comprise the element 1 as a sealing ring, as explained above.

Figure 5B:
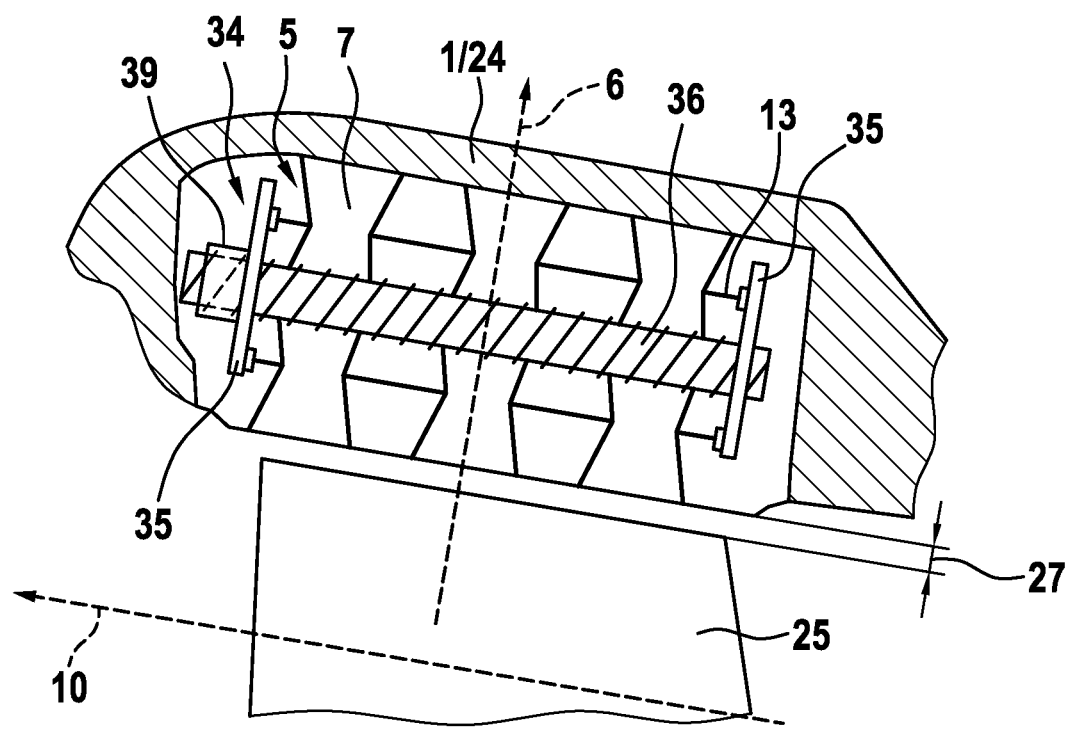

FIG. 5b shows a modification of the housing 24 configured as an element 1. In this case, the engine 20 or the housing 24 comprises a clamp 34. The clamp 34 comprises two perforated plates 35 and a screw 36, which is inserted into the perforated plates 35. One of the two perforated plates 35 comprises a thread, or both perforated plates 35 comprise opposing threads.

Furthermore, the clamp 34 comprises an actuator 39, which is connected to a control unit (not shown). The actuator 39 can turn the screw 36 in order to vary a distance between the perforated plates 35.

By turning the screw 36, a variable pressure can act on the auxetic portion 5 of the housing 24, as a result of which it is possible to vary the tolerance (clearance) with the blades 25. If, for example, the screw 36 is tightened, then pressure acts on the auxetic portion 5, such that the gap 27 between the housing 24 and the blade 25 increases.

The above-mentioned clearance can for example be varied during a flight with the engine 20, in order to advantageously vary characteristic variables of the engine 20. For example, a smaller gap produces better efficiency and greater power.

Figure 5C:
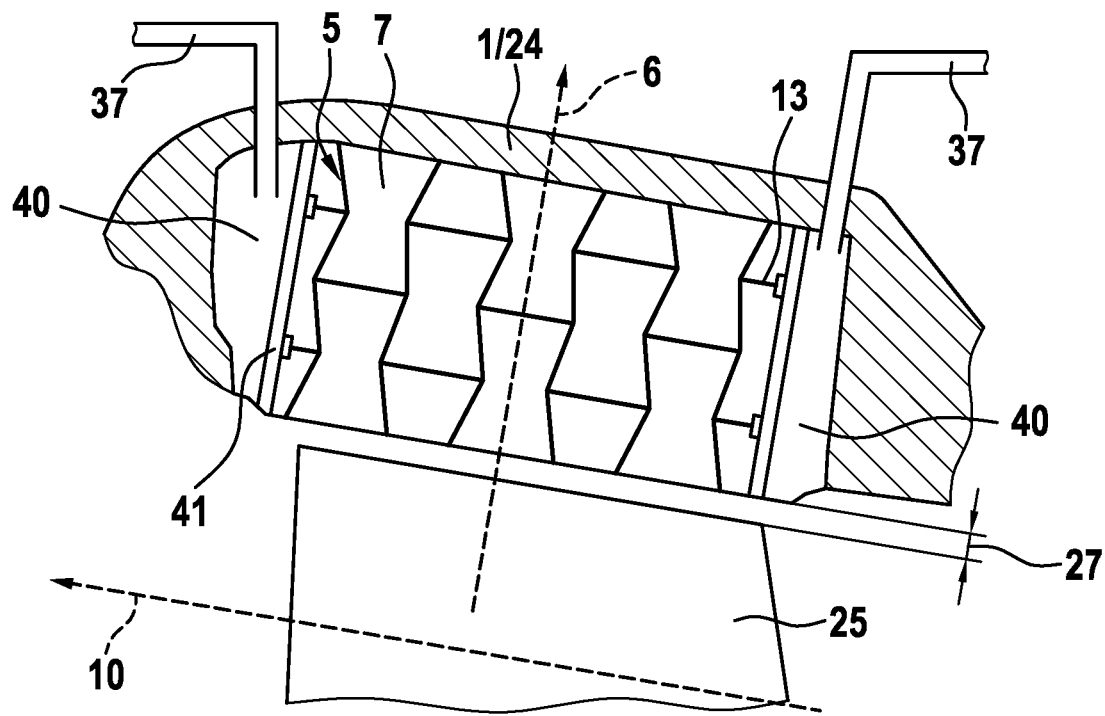

FIG. 5c shows a further modification of the housing 24 configured as an element 1. In this case, the engine 20 or the housing 24 comprises cavities 40. In this case, the housing 24, as shown in FIG. 5c, is double-walled, by means of side walls 41.

The cavities 40 are in each case connected with lines 37. The lines 37 can be connected to one another. The lines 37 are in particular equipped with valves, as a result of which the pressure can be regulated thereby.

In this case, the lines 37 are connected to the other stages, for example compressor 22 and/or turbine 23, and bleed compressed air from these. For this purpose, the engine 20 comprises bleed points (not shown) which are also used, for example, for bleeding compressed air from these stages 21, 22, 23, in order to operate an air-conditioning system of an aircraft.

The compressed air withdrawn from the other stages 22, 23 is conducted via the lines 37 into the cavities 40, as a result of which pressure is applied to the auxetic portion 5 of the housing 24 by means of the side walls 41.

For this purpose, the side walls 41 can for example be arranged in the housing 24 so as to be movably displaceable. Alternatively or in addition thereto, the side walls 41 can be configured to be flexible or resilient.

For letting out pressure in the cavities 40, the lines 37 can again be used. Alternatively or in addition thereto, the housing 24 can comprise at least one outlet valve (not shown) and/or at least one safety valve (not shown).

Figure 6A:
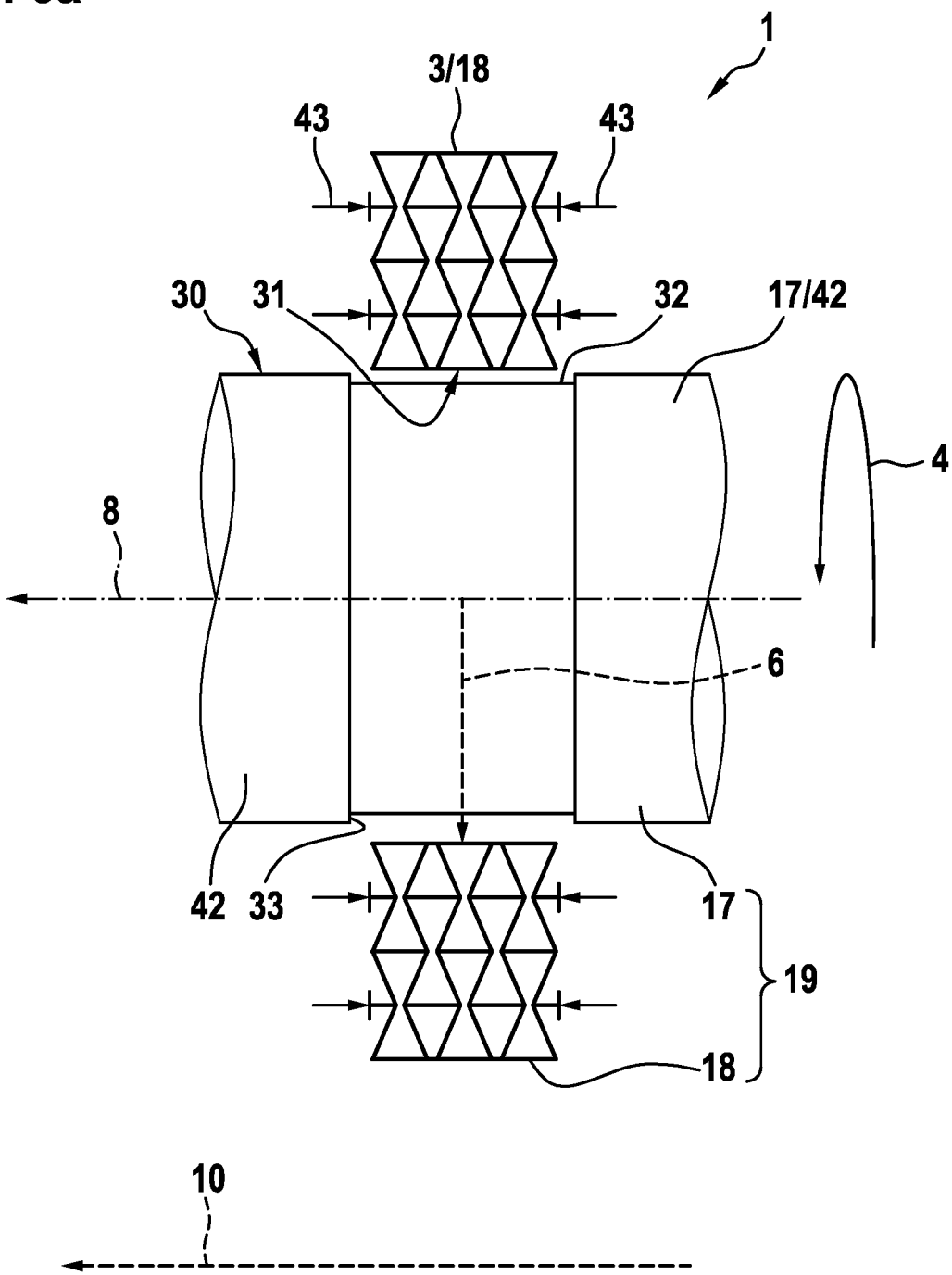
FIG. 6a, b are sketches of a shaft/hub connection comprising an element according to the first embodiment of the present invention.
Figure 6B:
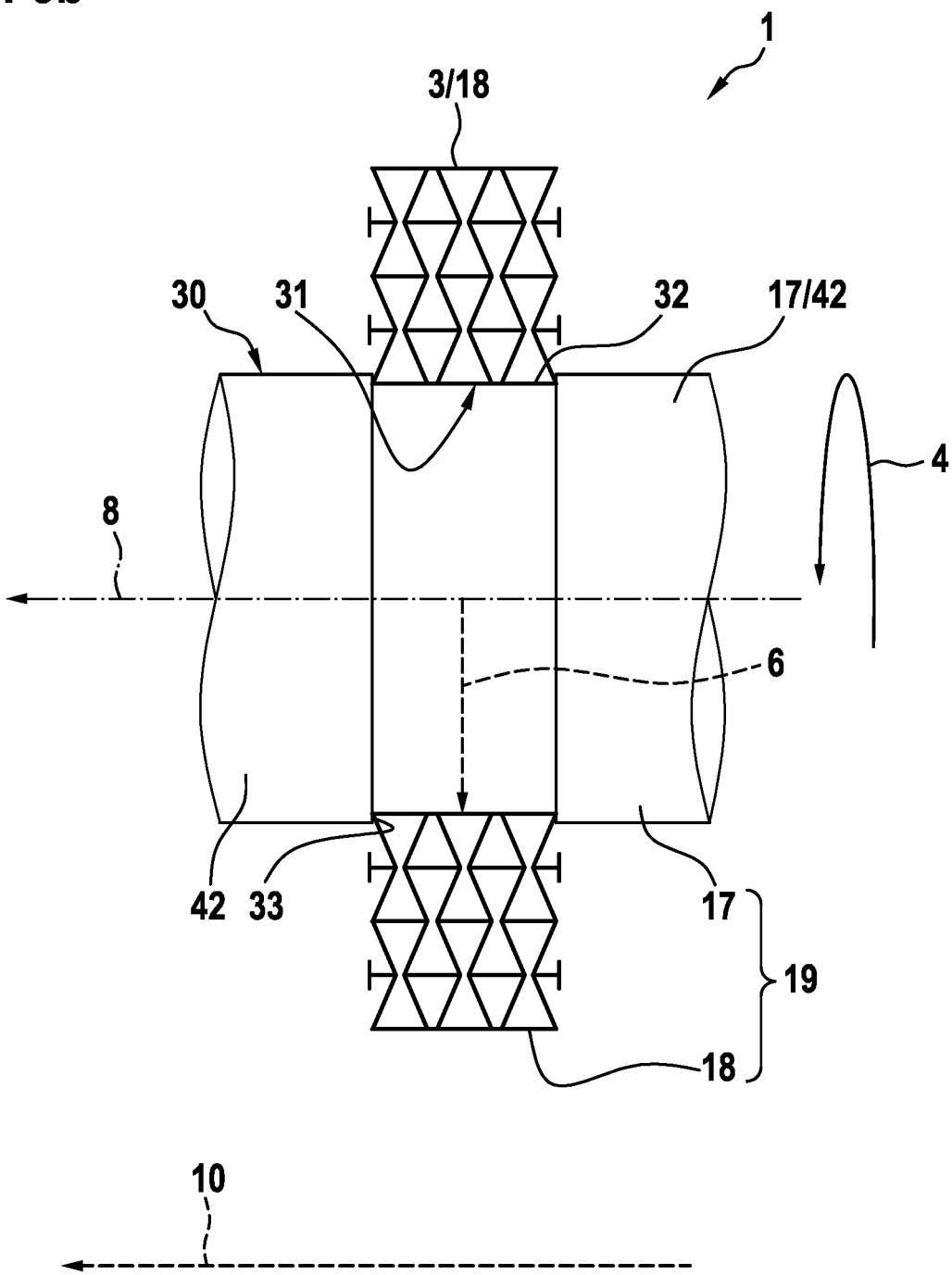
FIG. 6c is a block diagram of an assembly method for a shaft/hub connection comprising an element according to the first embodiment of the present invention.

In this case, FIG. 6a, 6b are each sketches of a shaft/hub connection 19 comprising an element 1 according to the first embodiment of the present invention. In this case, the element 1 is configured as a hub 18 of the shaft/hub connection 19. In this case, FIG. 6a shows the shaft/hub connection 19 in a state before an assembly method. In this case, FIG. 6b shows the shaft/hub connection 19 after the assembly method, i.e. in an assembled state. Owing to the cross-sectional view of the hub 18 shown in FIGS. 6a and 6b, only a cross section thereof is visible. The hub 18 can be configured to be angular or round in the peripheral direction 4, as described above with reference to FIGS. 1a to 1c.

In this case, the shaft/hub connection 19 in principle comprises a shaft 17 and the hub 18. The hub 18 is configured as an element 1 according to the explanations above, i.e. so as to be auxetic at least in portions, in the radial direction 6. The shaft 17 can also be configured as the element 1.

In this case (see also FIG. 1a), the hub 18 comprises at least one cross-sectional portion 3, which comprises an auxetic portion 5. As a result, at least one cross-sectional portion 3, preferably the entire hub 18, can exhibit auxetic behavior in the radial direction 6.

The shaft 17 comprises a groove 32. Due to said groove 32, the shaft 17 comprises undercuts 33. As can be seen from a comparison of FIGS. 6a and 6b, the element 1 or the hub 18 is now assemble don the shaft 17 as follows, in order to form the shaft/hub connection 19. This is explained with reference to FIG. 6c.

Figure 6C:
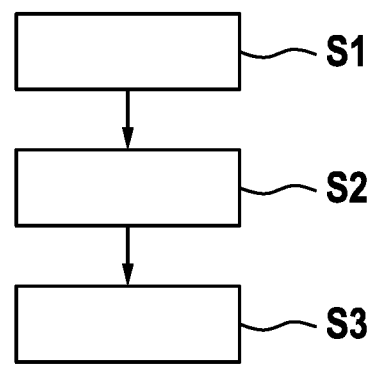

In this case, FIG. 6c is a block diagram of an assembly method for the shaft/hub connection 19 comprising the element 1 (here: the hub 18) according to the first embodiment of the present invention.

In this case, the auxetic behavior of the hub 18 is used as follows during the assembly of the shaft/hub connection 19:

Initially, in a first step S1, a compressive force is applied to the hub 18 in the longitudinal extension direction 10 of the hub 18 (see also FIG. 6a), as a result of which the inner periphery 31 of the hub 18 increases.

In a second step S2, the shaft 17 is introduced into the hub 18 during the application of pressure. In this case, an outer periphery 30 of the shaft 17 is configured, by means of the groove 32, in such a way that the hub 18 can be moved past portions 42 of the shaft 17 outside the groove 32 only in the event of pressure application of the hub 18 in the longitudinal extension direction 10. In other words, the inner periphery 31 of the hub 18 is larger, under application of pressure, than the outer periphery 30 at the portions 42 of the shaft 17.

In a third step S3, the pressure application is now interrupted or stopped (see also FIG. 6*b*). After the application of pressure, the inner periphery 31 of the hub 18 is reduced again, such that a particularly firm force-fitting and form-fitting connection between the hub 18 and shaft 17 results. As can be seen from FIG. 6*b*, the inner periphery 31 of the hub 18 is smaller, without application of pressure, than the outer periphery 30 of the shaft 17.

This assembly method, in particular the hub 18 configured as an element 1, makes it possible for a shaft 17 to be used for the shaft/hub connection 19 which comprises undercuts 33.

Alternatively or in addition thereto, the shaft 17 can be configured as the element 1. Thus, in particular the outer periphery 30 of the shaft 17 can be varied under compressive or tensile forces, in particular in the case of assembly of the shaft/hub connection 19.

After the assembly method explained above, the inner periphery 31 of the hub 18 can be set in a variable manner, by means of pressure application, such that in particular a slippage between the hub 18 and the shaft 17 can also be set.

The shaft/hub connection 19 explained above, the hub 18 and/or the shaft 17 can be contained in the engine 20 and/or connected to the engine 20.

Further embodiments of the auxetic portion 5 are now explained with reference to FIG. 7 and FIG. 8.

Figure 7:
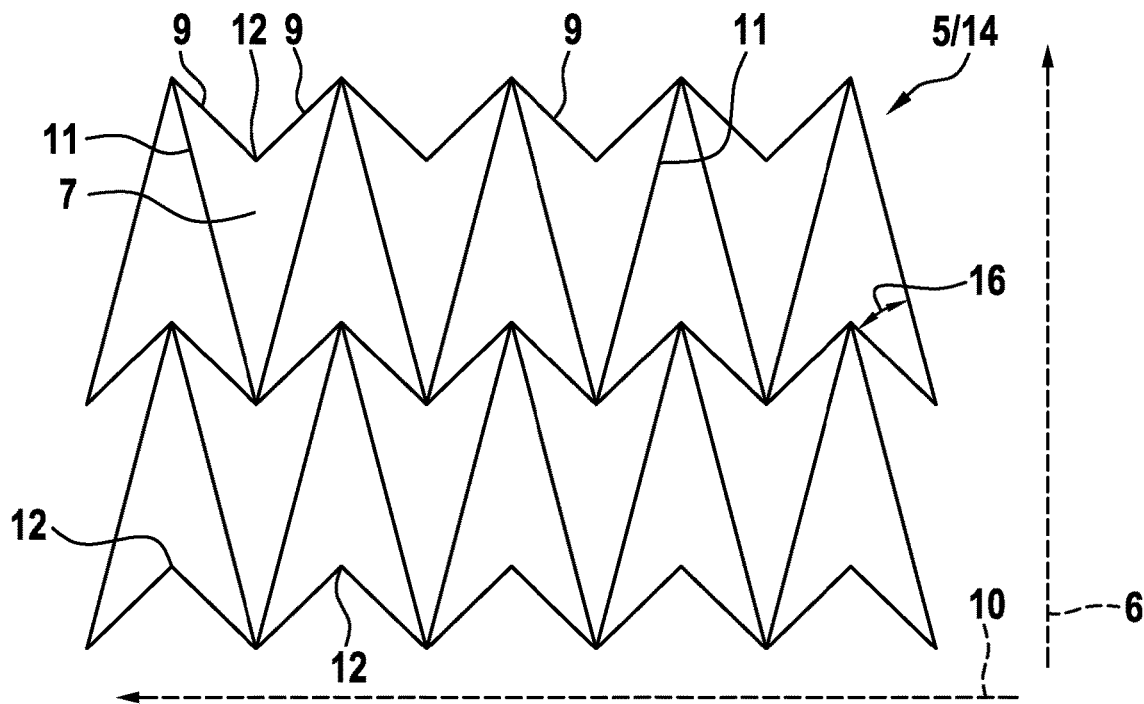
FIG. 7 is a schematic sketch of an auxetic portion, by way of example, of an element according to a second embodiment of the present invention.

In this case, FIG. 7 is a schematic sketch of an auxetic portion 5, by way of example, of an element 1 according to a second embodiment of the present invention.

FIG. 7 shows an auxetic portion 5 which is in the shape of a double arrowhead 14. In this case, the double arrowhead shape 14 also comprises auxetic cells 7, wherein the auxetic cells 7 comprise two longitudinal webs 9, which extend in the longitudinal extension direction 10, and two transverse webs 11, which are each connected at one end to one of the longitudinal webs 9 and at another end to one another. The two longitudinal webs 9 are furthermore connected to one of the kinks 12, which ensures a resilient auxetic behavior in the radial direction 6.

If a compressive force is now applied to the double arrowhead shape 14, in the longitudinal extension direction 10, then the angle 16 between the transverse webs 11 and the longitudinal webs 9 becomes smaller, such that overall a resilient auxetic behavior in the radial direction 6 arises.

Figure 8:
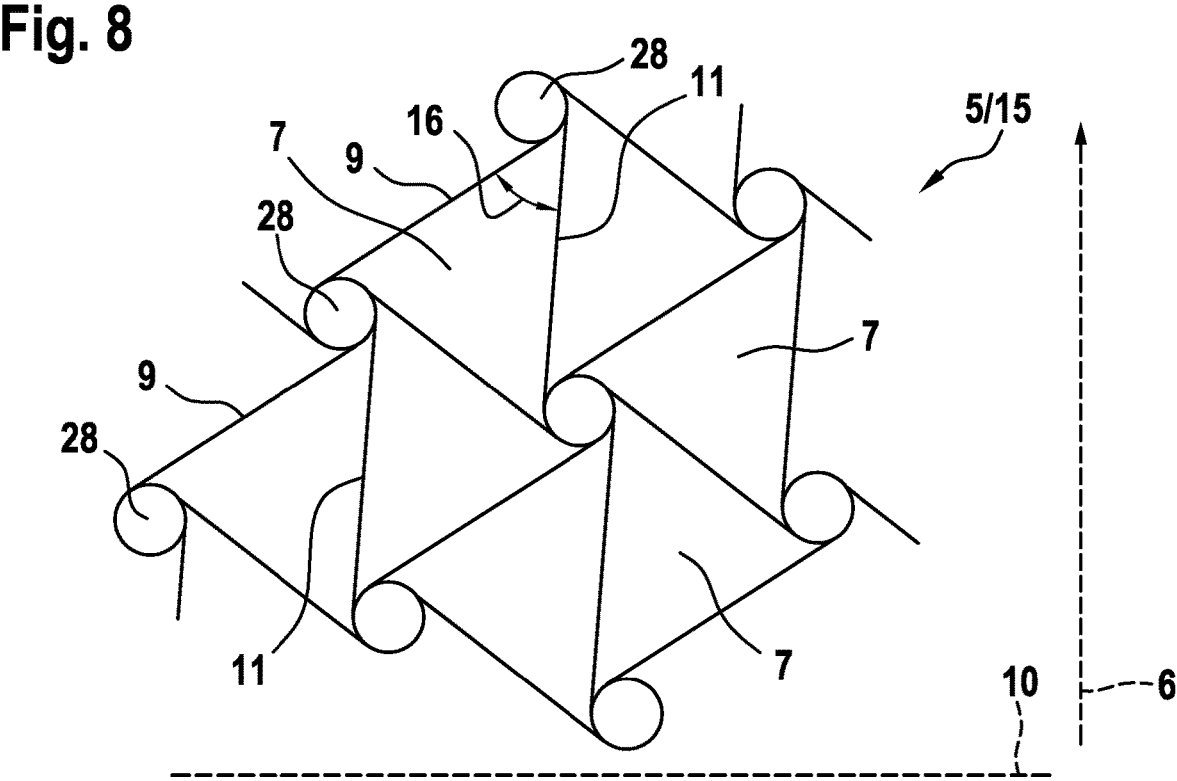
FIG. 8 is a schematic sketch of an auxetic portion, by way of example, of an element according to a third embodiment of the present invention.

FIG. 8 is a schematic sketch of an auxetic portion 5, by way of example, of an element 1 according to a third embodiment of the present invention.

FIG. 8 shows an auxetic portion 5 which is of a chiral shape 15. The chiral shape 15 is characterized by circles 28 which interconnect the plurality of auxetic cells 7 and are also configured to be resilient. The circles 28 connect longitudinal webs 9 and transverse webs 11, wherein in this case the transverse webs 11 extend in the radial direction 6. The angle 16 between the longitudinal webs 9 and the transverse webs 11 is approximately 45°.

If a compressive force is now applied in the longitudinal extension direction 10, then the longitudinal webs 9 and the transverse webs 11 coil around the circles 28, such that overall a thickness of the auxetic portion 5 reduces along the radial direction 6. In other words, in this case the chiral shape 15 exhibits auxetic behavior in the radial direction 6.

The chiral shape 15 and the double arrowhead shape 14 can also be used as a seal, as a shaft 17, as a hub 18 and/or as a housing 24, for example in the engine 20.

In addition to the above written description of the invention, for the additional disclosure thereof reference is hereby explicitly made to the illustrations of the invention in FIGS. 1*a* to 8. FIGS. 1*a* to 8 serve as an explicit disclosure, wherein details regarding what has been said above are visible from FIGS. 1*a* to 8.

LIST OF REFERENCE NUMERALS 1 element
2 main body
3 cross-sectional portion
4 peripheral direction
5 auxetic portion
6 radial direction
7 auxetic cells
8 longitudinal axis
9 longitudinal webs
10 longitudinal extension direction
11 transverse webs
12 kink
13 force web
14 arrowhead shape
15 chiral shape
16 angle
17 shaft
18 hub
19 shaft/hub connection
20 engine
21 fan stage
22 compressor
23 turbine
24 housing
25 blade
26 compressive forces
27 gap
28 circle
30 outer periphery
31 inner periphery
32 groove
33 undercut
34 clamp
35 perforated plate
36 screw
37 line
39 actuator
40 cavity
41 side wall
42 portion
43 compressive force
d distance
S1 first step
S2 second step
S3 third step The present disclosure may include one or more of the following concepts, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. Element (1) for compensation of tolerances and/or gap widths of a device, comprising:

a main body (2) which comprises at least one annular cross-sectional portion (3), wherein the cross-sectional portion (3) comprises, in its peripheral direction (4), at least one auxetic portion (5) which exhibits auxetic behavior in a radial direction (6) of the main body (2).

A1. Element (1) according to paragraph A0, wherein the at least one auxetic portion (5) comprises a plurality of interconnected, in particular adjoining, auxetic cells (7) in the radial direction (6).

A2. Element (1) according to any one of the preceding paragraphs, wherein the at least one auxetic portion (5) comprises, in a cross-section along a longitudinal axis (8) of the main body (2), two longitudinal webs (9) which extend in a longitudinal extension direction (10) in parallel with the longitudinal axis (8) of the main body (2), and two transverse webs (11) which extend between the longitudinal webs (9) and each comprise at least one kink (12).

A3. Element (1) according to paragraph A2, wherein the at least one auxetic portion (5) comprises at least one force web (13), wherein one end of the force web (13) is connected in each case to a kink (12), and wherein the at least one force web (13) extends in the longitudinal extension direction (10) of the main body (2), proceeding from the kink (12).

A4. Element (1) according to any one of the preceding paragraphs, wherein the at least one auxetic portion (5) is in the shape of a double arrowhead (14) or has a chiral shape (15).

A5. Element (1) according to any one of the preceding paragraphs, wherein the element (1) is configured as a seal, in particular as a contactless seal, and wherein the cross-sectional portion (3) of the main body (2) is entirely annular in shape, and the auxetic portion (5) of the main body (2) extends over an entire longitudinal extension direction (10), in particular in addition over the entire peripheral direction (4), of the main body (2).

A6. Element (1) according to any one of paragraphs A0 to A4, wherein the element (1) is configured as a housing (24) of the device.

A7. Element (1) according to any one of paragraphs A0 to A4, wherein the element (1) is configured as a shaft (17) and/or as a hub (18) of a shaft/hub connection (19).

A8. Engine (20), comprising at least one element (1) according to any one of paragraphs AO to A7.

A9. Engine (20) according to paragraph A8, wherein a fan stage (21) and/or a compressor (22) and/or a turbine (23) of the engine (20) comprises the at least one element (1), wherein the at least one element (1) is configured as a seal according to paragraph A5 or as a housing (24) of the fan stage (21) and/or of the compressor (22) and/or of the turbine (23) according to paragraph A6.

B0. Assembly method for a shaft/hub connection (19), wherein the shaft/hub connection (19) comprises a shaft (17) and a hub (18), wherein the shaft (17) and/or the hub (18) is configured as an element (1) according to any one of paragraphs A0 to A4, and wherein the assembly method comprises the following steps:
  a first step (S1), in which pressure is applied to the shaft (17) configured as the element (1) and/or to the hub (18) configured as the element (1), along a longitudinal extension direction (10) of the main body (2);
  a second step (S2), in which the shaft (17) is introduced into the hub (18);
  a third step (S3), in which the application of pressure to the shaft (17) and/or to the hub (18) is stopped.

C0. Adaptation method for adapting a tolerance and/or a gap width in an engine (20) according to paragraph A9, wherein the at least one element (1) is configured as a housing (24) of the fan stage (21) and/or of the compressor (22) and/or of the turbine (23), said method comprising the step of:
  applying pressure to the housing (24) such that the tolerance and/or the gap width between a blade (25) of the fan stage (21) and/or of the compressor (22) and/or of the turbine (23), and the housing (24) increases or decreases.

C1. Adaptation method according to paragraph C0, wherein pressure is applied pneumatically to the housing (24), wherein a pressure prevailing in the fan stage (21) and/or in the compressor (22) and/or in the turbine (23) is diverted to the housing (24). C2. Adaptation method according to paragraph C0 or C1, wherein pressure is applied mechanically to the housing (24), wherein the housing (24) is arranged in a clamp (34), and the clamp (34) applies pressure to the housing (24).

The invention claimed is:

1. A device, comprising:
   an element for compensation of tolerances and/or gap widths of the device, including:
     a main body which comprises at least one annular cross-sectional portion, wherein the cross-sectional portion comprises, in its peripheral direction, at least one auxetic portion which exhibits auxetic behavior in a radial direction of the main body; and
   a control unit, configured to control an application of pressure to the element.

2. The device according to claim 1, wherein the at least one auxetic portion comprises a plurality of interconnected, in particular adjoining, auxetic cells in the radial direction.

3. The device according to claim 1, wherein the at least one auxetic portion comprises, in a cross-section along a longitudinal axis of the main body, two longitudinal webs which extend in a longitudinal extension direction in parallel with the longitudinal axis of the main body, and two transverse webs which extend between the longitudinal webs and each comprise at least one kink.

4. The device according to claim 3, wherein the at least one auxetic portion comprises at least one force web, wherein one end of the force web is connected in each case to a kink, and wherein the at least one force web extends in the longitudinal extension direction of the main body, proceeding from the kink.

5. The device according to claim 1, wherein the at least one auxetic portion is in the shape of a double arrowhead or has a chiral shape.

6. The device according to claim 1, wherein the element is configured as a seal, in particular as a contactless seal, and wherein the cross-sectional portion of the main body is entirely annular in shape, and the auxetic portion of the main body extends over an entire longitudinal extension direction, in particular in addition over the entire peripheral direction, of the main body.

7. The device according to claim 1, wherein the element is configured as a housing of the device.

8. The elementdevice according to claim 1, wherein the element is configured as a shaft and/or as a hub of a shaft/hub connection.

9. The elementdevice according to claim 1, wherein the device is an engine.

10. The device according to claim 9, wherein a fan stage and/or a compressor and/or a turbine of the engine comprises the element, wherein the element is configured as a seal according to claim 6 or as a housing of the fan stage and/or of the compressor and/or of the turbine according to claim 7.

11. An assembly method for a shaft/hub connection, wherein:

the shaft/hub connection comprises a shaft and a hub, the shaft and/or the hub is configured as an element for compensation of tolerances and/or gap widths of a device, the element comprising a main body which comprises at least one annular cross-sectional portion, the cross-sectional portion comprises, in its peripheral direction, at least one auxetic portion which exhibits auxetic behavior in a radial direction of the main body, and the assembly method comprises the following steps:

a first step, in which pressure is applied to the shaft configured as the element and/or to the hub configured as the element, along a longitudinal extension direction of the main body;

a second step, in which the shaft is introduced into the hub;

a third step, in which the application of pressure to the shaft and/or to the hub is stopped.

12. An adaptation method for adapting a tolerance and/or a gap width in an engine, wherein:

the engine comprises an element for compensation of tolerances and/or gap widths of the engine, the element comprising a main body which comprises at least one annular cross-sectional portion, the cross-sectional portion comprises, in its peripheral direction, at least one auxetic portion which exhibits auxetic behavior in a radial direction of the main body, and the element is configured as a housing of a fan stage and/or of a compressor and/or of a turbine, said method comprising the step of:

actively applying pressure to the housing such that the tolerance and/or the gap width between a blade of the fan stage and/or of the compressor and/or of the turbine, and the housing increases or decreases.

13. The adaptation method according to claim 12, wherein pressure is applied pneumatically to the housing, wherein a pressure prevailing in the fan stage and/or in the compressor and/or in the turbine is diverted to the housing.

14. The adaptation method according to claim 12, wherein pressure is applied mechanically to the housing, wherein the housing is arranged in a clamp, and the clamp applies pressure to the housing.

15. The adaptation method according to claim 12, wherein the active application of pressure is controlled by a control unit of the engine.

\* \* \* \* \*